Dec. 27, 1949  D. W. BINGHAM  2,492,260
APPARATUS FOR DICING FRUIT, VEGETABLES AND THE LIKE
Filed May 27, 1948  3 Sheets-Sheet 1

Inventor
David W. Bingham
By Jas. Inverno Atty.

Dec. 27, 1949 D. W. BINGHAM 2,492,260
APPARATUS FOR DICING FRUIT, VEGETABLES AND THE LIKE
Filed May 27, 1948 3 Sheets-Sheet 3

Inventor
David. W. Bingham
By [signature]
Atty.

Patented Dec. 27, 1949

2,492,260

UNITED STATES PATENT OFFICE 2,492,260

APPARATUS FOR DICING FRUIT, VEGETABLES, AND THE LIKE

David William Bingham, Brighton, Victoria, Australia

Application May 27, 1948, Serial No. 29,544
In Australia May 27, 1947

6 Claims. (Cl. 146—78)

This invention relates to apparatus for dicing fruit, vegetables and the like and more particularly refers to that type of apparatus in which the fruit to be diced is fed to a set of dicing blades through a feed passage and cut transversely into slices of predetermined thickness as it emerges from said passage prior to being forced through the dicing blades by a wedge-like thrust member.

The primary object of the present invention is to provide improved apparatus of the kind indicated which has a materially increased output, whilst the possibility of the fruit or vegetables becoming bridged or wedged across and thus interrupting the feed in any part of the apparatus either leading to or from the dicing blades is effectively prevented or at least reduced to a minimum.

Other advantages provided by the improved apparatus include even distribution of the fruit to a plurality of feed passages leading to the dicer blades, better packing of the fruit in each of said passages to ensure effective dicing, and the collection and carriage of the diced fruit to a common outlet which is capable of being located at a higher level than hitherto so as to enable the diced fruit to be discharged through a rotary screen or the like and onto a conveyor or elevator if so desired.

The above and various other objects and novel constructional features of the invention will be more readily apparent from the following description of one practical embodiment.

Referring to the drawings which form part of this specification:

Figure 1:
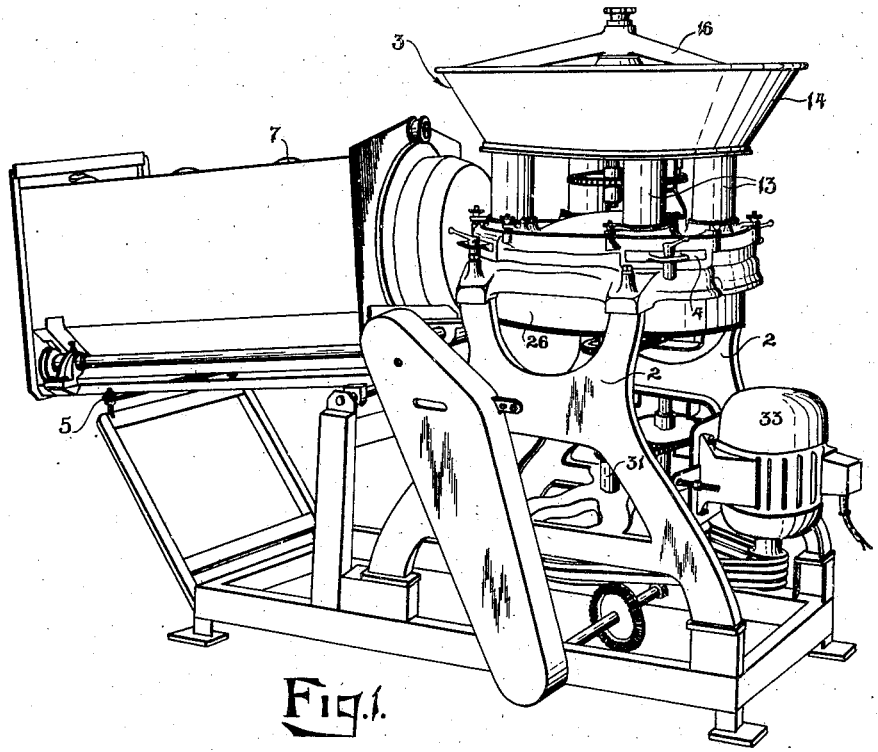
Figure 1 is a perspective view of dicing apparatus in accordance with a preferred embodiment of the present invention.

Apparatus in accordance with the present invention includes an upstanding supporting frame 2 carrying an elevated hopper 3 and a plurality of dicing stations 4 located beneath the hopper and having a common discharge outlet 6 associated therewith. The discharge outlet may lead to a rotary screen or the like 7 which is also mounted on the supporting frame at one side of the hopper and may consist of a series of circumferentially spaced rods extending lengthwise of the screen frame. The latter is inclined downwardly towards its outer end so that the diced fruit may gravitate whilst being screened, onto an elevator or conveyor or simply into a receptacle. Adjustable struts 5 or any other suitable means may be provided for varying the inclination of the screen.

The hopper which is adapted to receive the fruit or the like to be diced, includes means for agitating the fruit whilst it is in the hopper in order to prevent it becoming bridged or wedged therein and thus interrupting the feed to the dicing stations.

Figure 2:
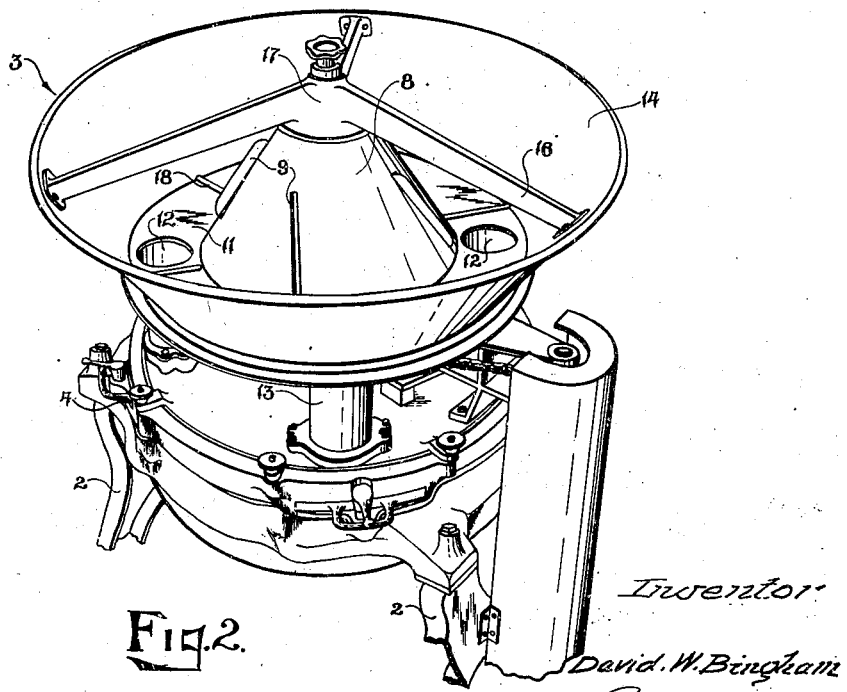
Figure 2 is a fragmentary perspective view on an enlarged scale showing the elevated hopper and adjacent parts of the apparatus.
Figure 3:
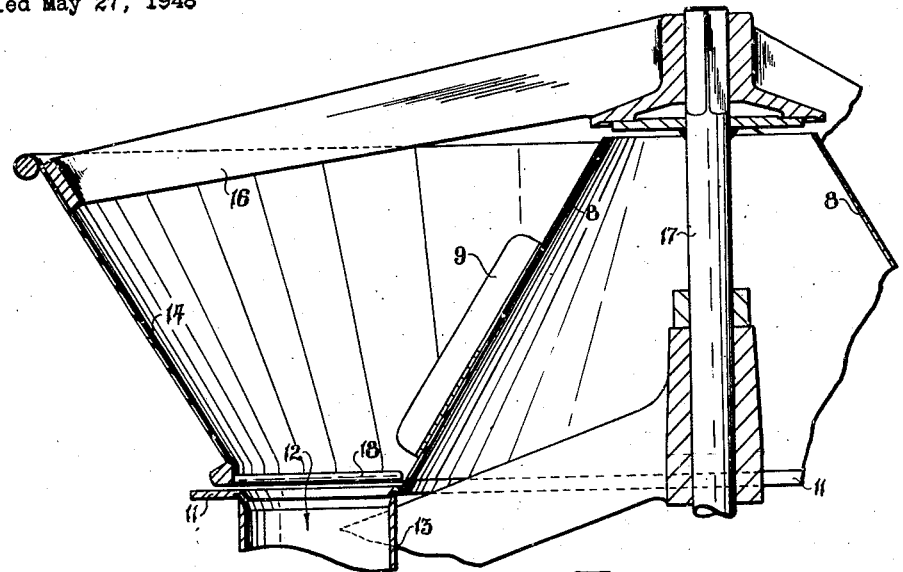
Figure 3 is a fragmentary cross section of portion of the hopper.

As seen more clearly in Figs. 2 and 3 of the drawings, the hopper is preferably of annular form in plan and of substantially V shape in section and consists of separate inner and outer walls one of which is fixed whilst the other is rotatable in relation thereto about a common axis. For example, the inner wall 8 may be fixed and mounted upon any suitable stationary part of the apparatus. A plurality of circumferentially spaced vanes 9 are preferably provided on the inner face of the fixed wall in order to prevent the fruit in the hopper from sliding around bodily over the inner face of the fixed wall when the device is in use. These vanes extend cross-wise of the fixed wall and are preferably inclined in the direction of travel of the fruit.

The lower end of the fixed wall is connected in any suitable manner to a transverse bottom wall 11 in the hopper. A series of circumferentially spaced outlet holes 12 are formed in this bottom wall and each of the holes may have a depending open ended feed tube 13 associated therewith leading to a set of dicing blades. These feed tubes which are mounted upon a stationary part of the supporting frame may be adapted to carry both the bottom wall and the associated stationary side wall of the hopper.

In this case, the outer movable wall 14 of the hopper may be carried by a series of radial arms 16 on an upstanding post 17 which is mounted in bearings on the machine frame and adapted to be rotated by an endless driving chain 17 or in any other suitable manner. The lower edge of the outer wall is located in close proximity to the bottom wall of the hopper and preferably carries a series of circumferentially spaced sweeper arms 18 which extend crosswise of the bottom wall and constitute means for agitating and sweeping the fruit in the hopper along the bottom wall. The arrangement is such that the fruit in the hopper is constantly being disturbed and prevented from packing. In addition effective distribution of the fruit to the series of outlet holes 12 is provided.

Figure 4:
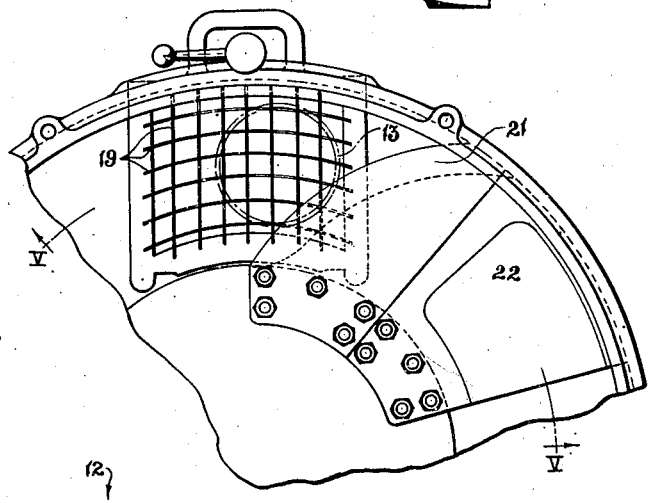
Figure 4 is a fragmentary plan view showing one of the dicing stations and adjacent parts of the apparatus.
Figure 5:
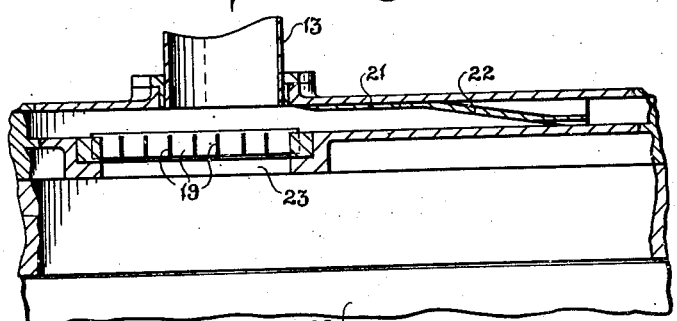
Figure 5 is a sectional elevation of the dicing station taken on the line V—V of Figure 4.

Mounted upon the machine frame beneath the hopper is a series of dicing stations which are circumferentially spaced so as to register with the lower ends of the feed tubes 13. Each of these dicing stations is preferably of a type which is shown per se, and as shown in Figs. 4 and 5 of the drawings, includes two parallel sets of intersecting and stationary blades 19 having a rotatable knife 21 and a wedge-like thrust member 22 associated therewith. These members are mounted between the sets of blades and the bottom wall 11 of the hopper so as to dice the fruit being delivered through the several hopper outlets.

In combination with the foregoing, means are provided for collecting the diced fruit from the series of dicing stations and delivering it to the common discharge outlet 6. For this purpose each of the dicing stations may deliver the diced fruit through an open ended passage 23 into a collecting trough 24. The latter is preferably of annular formation in plan and of substantially U or channel shape in cross section.

Figure 6:
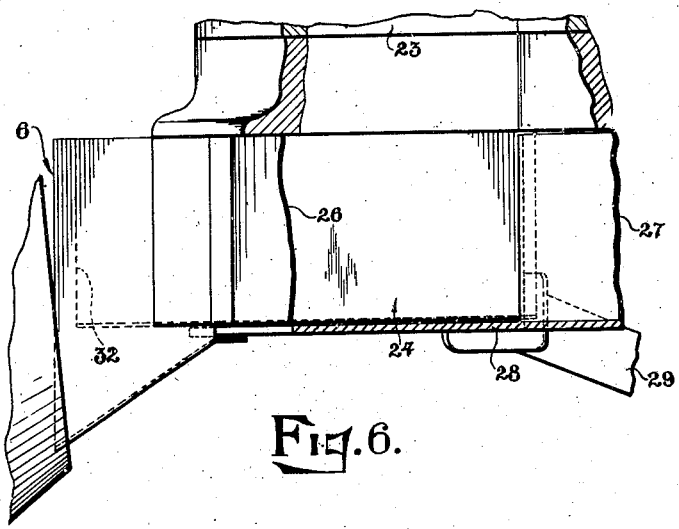
Figures 6 and 7 are a fragmentary sectional elevation and a fragmentary plan view respectively of portion of an annular trough for collecting and conveying the diced fruit to a common discharge outlet.
Figure 7:
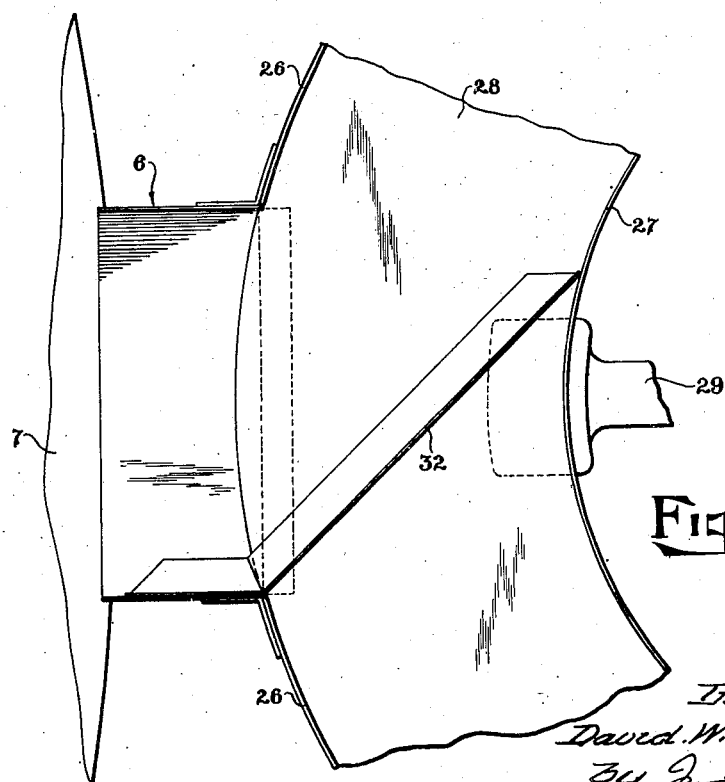

As seen more clearly in Figs. 6 and 7 of the drawings, one of the upstanding walls of the U-shaped collecting trough is also preferably fixed, whilst the other is rotatable in relation thereto about a common axis. For example, the outer wall 26 of the trough may be stationarily mounted upon a convenient part of the machine frame, whilst the inner wall 27 and bottom 28 of the trough may be carried by a series of arms 29 or any other suitable rotatable support secured to an upstanding shaft 31 which is mounted in bearings on the machine frame and adapted to be power driven in any suitable manner. The provision of fixed and movable wall sections in the collecting trough also prevents the diced fruit from becoming bridged or wedged therein and thus interrupting the discharge from the machine.

The outer fixed wall 26 of the trough has an outlet opening communicating with the common discharge outlet 6, one wall of which may be provided with an inclined deflector plate 32 which extends transversely across the bottom of the trough 24 so that the diced fruit may be swept by the rotating portions of the trough against the deflector plate and thus directed through the discharge outlet. The latter may communicate with the rotary screen 7, a conveyor or elevator or any suitable receptacle as may be required.

The apparatus is preferably provided with its own power unit, for example in the form of an electric motor 33 mounted upon the machine frame and connected by shafts and gearing and chain drives or in any other suitable manner with the movable components of the apparatus.

In use the improved hopper 3 functions to provide a continuous and even distribution of the fruit or vegetables to the various dicing stations. Such an even distribuition ensures the fruit being fed from the hopper in such a manner as to form an effective head of fruit in each of the feed tubes 13 leading to a dicing station which enables the dicing to be carried out most effectively. The diced fruit is collected in the annular collecting trough 24 and prevented from wedging therein until it is swept out through the discharge opening.

The manner in which the fruit or the like in the hopper is agitated and evenly distributed and packed in the several feed passages leading to the dicing stations, is considered to be of particular importance. Unless an effective head of fruit or the like is provided in each feed passage, poor quality dicing necessarily follows. In this respect, the present invention provides a material improvement over previous types of machines and automatically ensures the delivery from all of the dicing stations of a diced product of high standard.

Various alterations, modifications and/or additions may be incorporated in the foregoing combination and arrangement of parts without departing from the ambit of the invention as defined by the appended claims.

Having now described my invention, what I claim as new and desire to secure by Letters Patent is:

1. Apparatus for handling fruit, vegetables and the like comprising a supporting frame, an annular hopper mounted on said frame, a half section of said hopper being of substantially V shape in cross section with a transverse bottom wall and including stationary inner and bottom walls and a rotatable outer wall, a plurality of circumferentially spaced outlet openings in said bottom wall, a feed passage depending from each opening, a plurality of dicing stations respectively positioned beneath said feed passages, dicing means at said stations, a series of circumferentially spaced radial sweeper arms carried by said outer wall and overlying said bottom wall for distributing the contents of the hopper along said bottom wall and into the several outlet openings, and an annular trough beneath said dicing stations for collecting the diced fruit therefrom and delivering it to a common discharge outlet.

2. Apparatus as defined in claim 1 wherein said trough has a bottom wall and upstanding side walls, one of said side walls being stationary and the other of said side walls and said bottom wall being rotatable in relation thereto.

3. Apparatus as defined in claim 2 wherein the outer wall is stationary and a deflector is carried thereby and overlies said bottom wall for directing the diced fruit to said discharge.

4. Apparatus as defined in claim 1 wherein a movable knife and thrust member are positioned between the discharge end of said feed passages and said dicing stations.

5. Apparatus according to claim 1 wherein the inner wall of said hopper is provided with a plurality of circumferentially spaced vanes on the inner face thereof, the vanes extending crosswise of said stationary wall and being inclined in the direction of rotation of the movable wall.

6. Apparatus according to claim 1, wherein said feed passages consist of a series of circumferentially spaced upstanding tubes which are open ended and mounted upon said frame and support said transverse bottom wall and the stationary inner wall of said hopper.

DAVID WILLIAM BINGHAM.

REFERENCES CITED

The following references are of record in the file of this patent:

UNITED STATES PATENTS

| Number | Name | Date |
|---|---|---|
| Re. 22,437 | Sinden | Feb. 15, 1944 |
| 82,741 | Nairn | Oct. 6, 1868 |
| 1,336,785 | Matter and Conley | Apr. 13, 1920 |
| 1,548,126 | Field | Aug. 4, 1925 |
| 1,881,908 | Papac | Oct. 11, 1932 |
| 2,016,167 | Carlson | Oct. 1, 1935 |

FOREIGN PATENTS

| Number | Country | Date |
|---|---|---|
| 294,736 | Great Britain | May 26, 1927 |